US005506602A

United States Patent [19]

Yokoyama

[11] Patent Number: 5,506,602

[45] Date of Patent: Apr. 9, 1996

[54] DISPLAY CONTROL APPARATUS AND METHOD WHEREBY A DISPLAY IDENTIFIES ITS DISPLAY CONTROL METHOD TO A DISPLAY CONTROLLER IN ORDER THAT THE DISPLAY CONTROLLER CAN CONFIGURE ITSELF TO OUTPUT THE DISPLAY CONTROL SIGNALS CORRESPONDING TO THE IDENTIFIED DISPLAY CO

[75] Inventor: Noboru Yokoyama, Tokyo, Japan

[73] Assignee: Canon Kabushiki Kaisha, Tokyo, Japan

[21] Appl. No.: 465,578

[22] Filed: Jun. 5, 1995

Related U.S. Application Data

[63] Continuation of Ser. No. 110,195, Aug. 23, 1993, abandoned, which is a continuation of Ser. No. 807,656, Dec. 16, 1991, abandoned, which is a continuation of Ser. No. 373,168, Jun. 29, 1989, abandoned.

[30] Foreign Application Priority Data

Jul. 7, 1988 [JP] Japan .................................. 63-167796

[51] Int. Cl.[6] .............................. G06F 3/14; G06F 15/177

[52] U.S. Cl. ............................ 345/132; 345/11; 395/500; 395/830; 395/834; 364/DIG. 1; 364/237.3; 364/239.3

[58] Field of Search ................................ 345/1, 3, 11, 23, 345/127, 132, 204; 395/828, 830, 834, 836, 500

[56] References Cited

U.S. PATENT DOCUMENTS

| | | | |
|---|---|---|---|
| 4,574,279 | 3/1986 | Roberts | 345/127 |
| 4,704,697 | 11/1987 | Kiremidjian et al. | 340/717 |
| 4,749,990 | 6/1988 | Birkner | 340/799 |
| 4,757,441 | 7/1988 | Buckland et al. | 340/721 |
| 4,845,480 | 7/1989 | Satou | 340/717 |
| 4,897,799 | 1/1990 | LeGall et al. | 364/514 |
| 4,918,436 | 4/1990 | Johady | 345/197 |
| 4,924,410 | 5/1990 | Hamada | 364/521 |
| 4,926,166 | 5/1990 | Fujisawa et al. | 340/720 |
| 4,965,559 | 10/1990 | Dye | 340/720 |
| 4,990,904 | 2/1991 | Zenda | 345/192 |
| 5,038,301 | 8/1991 | Thoma, III | 364/521 |
| 5,072,411 | 12/1991 | Yamaki | 395/700 |

*Primary Examiner*—Thomas G. Black
*Assistant Examiner*—John C. Loomis
*Attorney, Agent, or Firm*—Fitzpatrick, Cella, Harper & Scinto

[57] ABSTRACT

A display control unit comprises plural display units having different display control methods, an input system for inputting an identifying signal relative to the display control method of the display unit and a display timing generator for changing a period of applying a display control signal in accordance with the identifying signal input by the input means. A control unit controls the display units having the display control method corresponding to the identifying signal by the display control signal applied by the display timing generator.

31 Claims, 23 Drawing Sheets

| FIG. 1A | FIG. 1B | FIG. 1C |
|---|---|---|

| LINE NO. | ADDRESS SEEN FROM BUS MASTER | LINE NO. OF EACH FIELD | ADDRESS IN VRAM row | ADDRESS IN VRAM col |
|---|---|---|---|---|
| 0 | 0 | 0 | 00 | 00 |
| 1 | 80 | 0 | 00 | 80 |
| 2 | 100 | 1 | 00 | 20 |
| 3 | 180 | 1 | 00 | a0 |
| 4 | 200 | 2 | 00 | 40 |
| 5 | 280 | 2 | 00 | c0 |
| 6 | 300 | 3 | 00 | 60 |
| 7 | 380 | 3 | 00 | e0 |
| ⋮ | ⋮ | ⋮ | ⋮ | ⋮ |
| 2046 | 3ff00 | 1023 | ff | 60 |
| 2047 | 3ff80 | 1023 | ff | e0 |

| LINE NO. | ADDRESS SEEN FROM BUS MASTER | LINE NO. OF EACH FIELD | block | ADDRESS IN VRAM row | ADDRESS IN VRAM col |
|---|---|---|---|---|---|
| 0 | 0 | 0 | 0 | 00 | 00 |
| 1 | 100 | 0 | 0 | 00 | 80 |
| 2 | 200 | 1 | 0 | 00 | 40 |
| 3 | 300 | 1 | 0 | 00 | c0 |
| 4 | 400 | 2 | 0 | 01 | 00 |
| 5 | 500 | 2 | 0 | 01 | 80 |
| 6 | 600 | 3 | 0 | 01 | 40 |
| 7 | 700 | 3 | 0 | 01 | c0 |
| ⋮ | ⋮ | ⋮ | | ⋮ | |
| 1023 | 3ff00 | 511 | 0 | ff | c0 |
| 1024 | 40000 | 512 | 1 | 00 | 00 |
| ⋮ | ⋮ | ⋮ | | ⋮ | |
| 2046 | 7fe00 | 1023 | 1 | ff | 40 |
| 2047 | 7ff00 | 1023 | 1 | ff | c0 |

DISPLAY CONTROL APPARATUS AND METHOD WHEREBY A DISPLAY IDENTIFIES ITS DISPLAY CONTROL METHOD TO A DISPLAY CONTROLLER IN ORDER THAT THE DISPLAY CONTROLLER CAN CONFIGURE ITSELF TO OUTPUT THE DISPLAY CONTROL SIGNALS CORRESPONDING TO THE IDENTIFIED DISPLAY CO

This application is a continuation of application Ser. No. 08/110,195, filed Aug. 23, 1993, which is a continuation of application Ser. No. 07/807,656, filed Dec. 16, 1991, which is a continuation of application Ser. No. 07/373,168, filed Jun. 29, 1989, now all abandoned.

BACKGROUND OF THE INVENTION

1. Field of the Invention

This invention relates to a display control unit, and more particularly, to a display control unit for storing image data from a host apparatus and outputting the data to a display unit having a predetermined display control method.

2. Description of the Related Art

As a typical unit of this kind, there is a CRT display control unit, Heretofore, however, for a particular display control method or format of a CRT display unit, such as a given size picture surface, a particular synchronizing method, interlace/noninterlace operation or the like, the configuration and control method of a control unit are also fixed, Hence, even :should an operator desire to do so, it would be impossible to use a CRT unit having a different display format.

SUMMARY OF THE INVENTION

It is an object of the present invention to provide a display control unit which can display images even if display units having various kinds of display control methods are connected together.

It is another object of the present invention to provide a display control unit which can display images even if display units having different scanning frequencies for display are connected together.

It is still another object of the present invention to provide a display control unit which can display images even if display units having different picture-surface sizes are connected together.

In accordance with one aspect of the invention, a display control unit comprises plural display means for displaying images, with the display means having different display control methods and being responsive to a display control signal, input means for inputting an identifying signal identifying the display control method of each display means, and display timing generation means for changing a period of applying a display control signal in accordance with the identifying signal input by the input means. Control means controls the display means having the display control method identified by the identifying signal by controlling the display control signal applied by the display timing generation means.

In accordance with another aspect of the invention, a display control unit comprises plural display means for displaying images, with the display means having different display control methods, input means for inputting an identifying signal identifying the display control method of the display means, and memory means for storing image data. Random access means accesses the memory means and converts an address from a host apparatus into an address of the display control method identified by the input identifying signal, serial access means serially reads the image data in the memory means with a sequence in accordance with the input identifying signal and provides the read data to the display means having the identified display control method, and control means controls the random access means and serial access means.

DETAILED DESCRIPTION OF THE PREFERRED EMBODIMENT

An embodiment of the present invention will be hereinafter explained in detail with reference to the accompanying drawings.

Figure 1A:
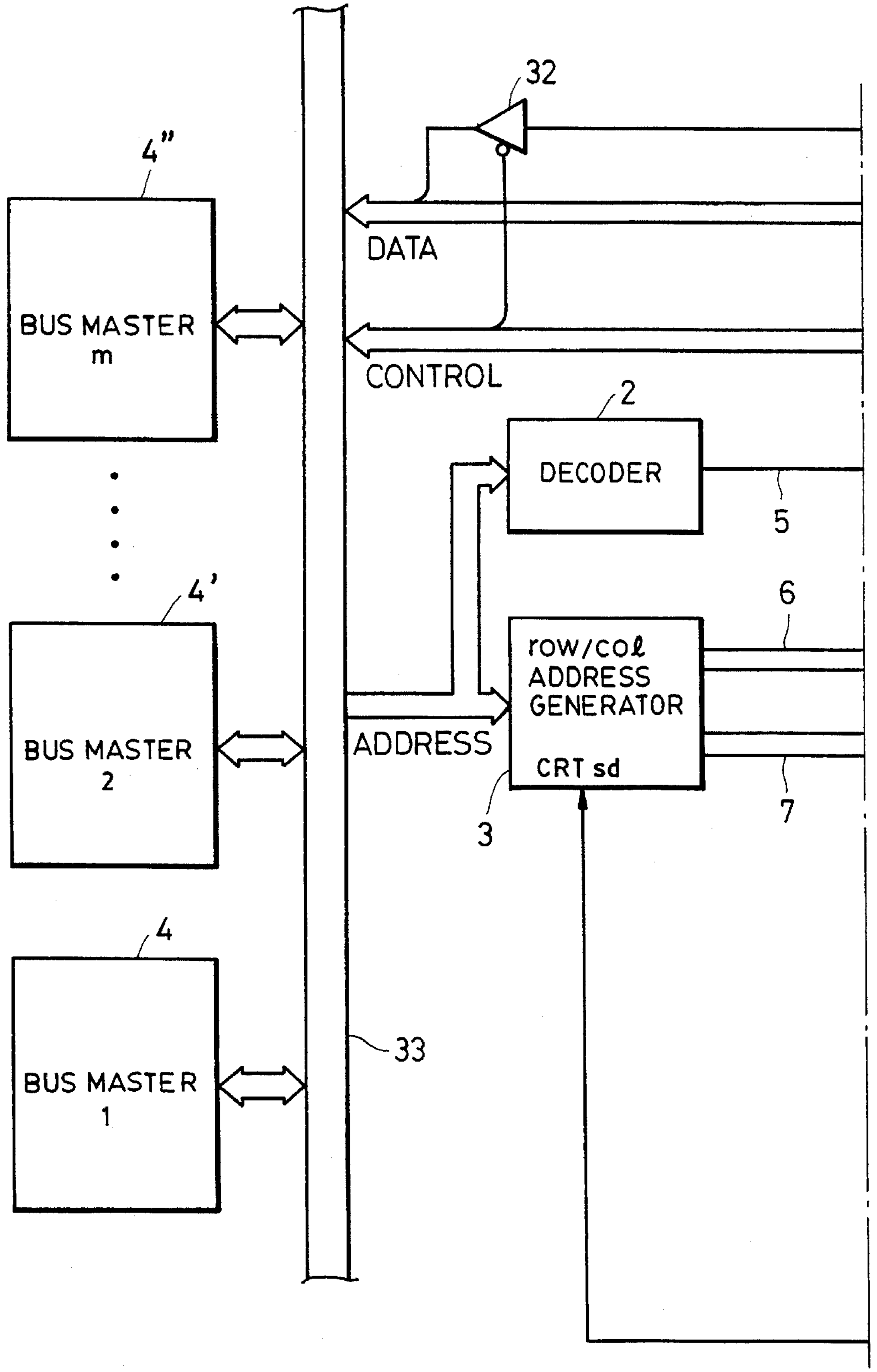
FIGS. 1A, 1B and 1C, is a block diagram of a display control unit of an embodiment of the invention.
Figures 1, 1B:
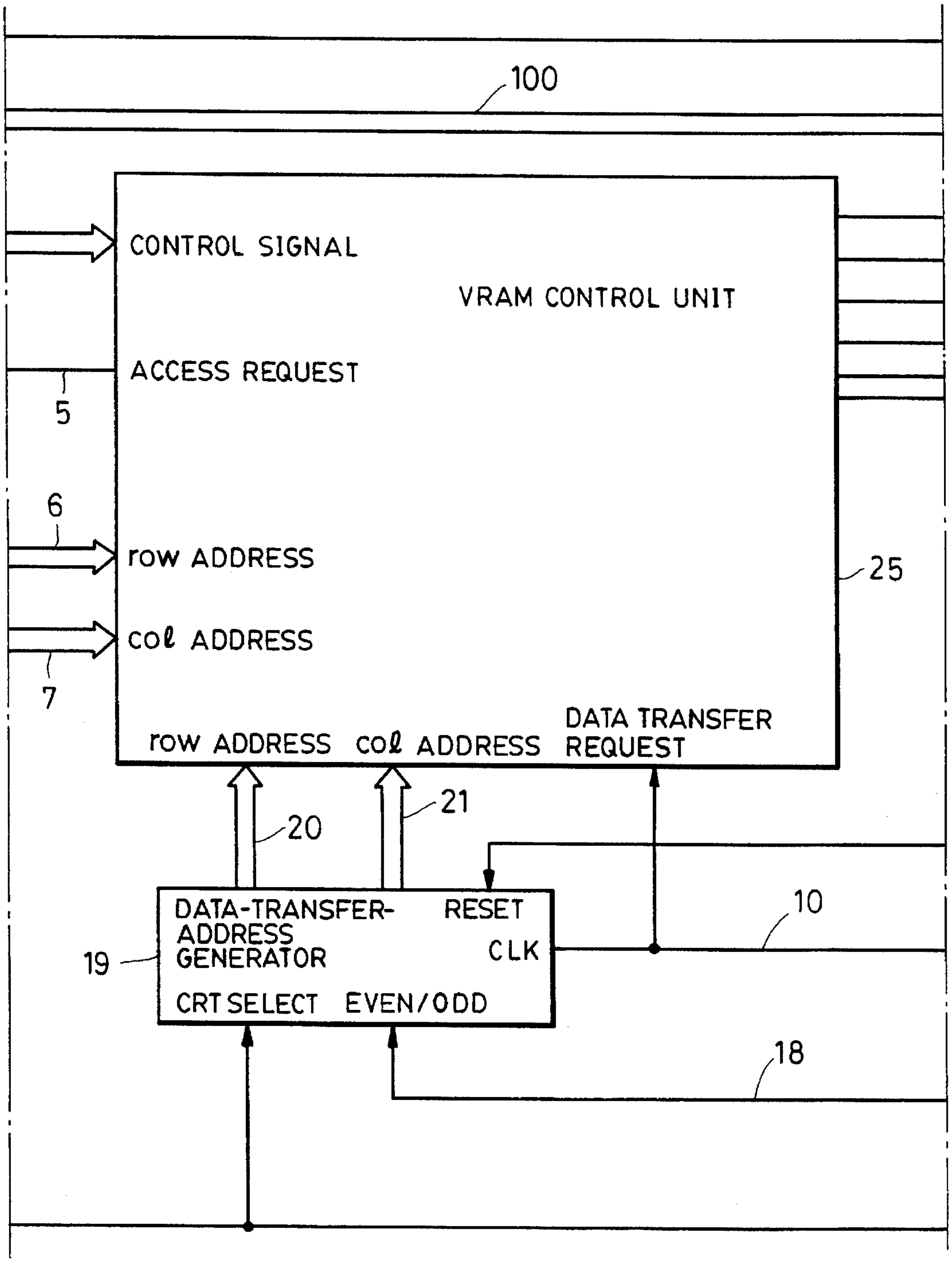
FIG. 1, which is divided into
Figure 1C:
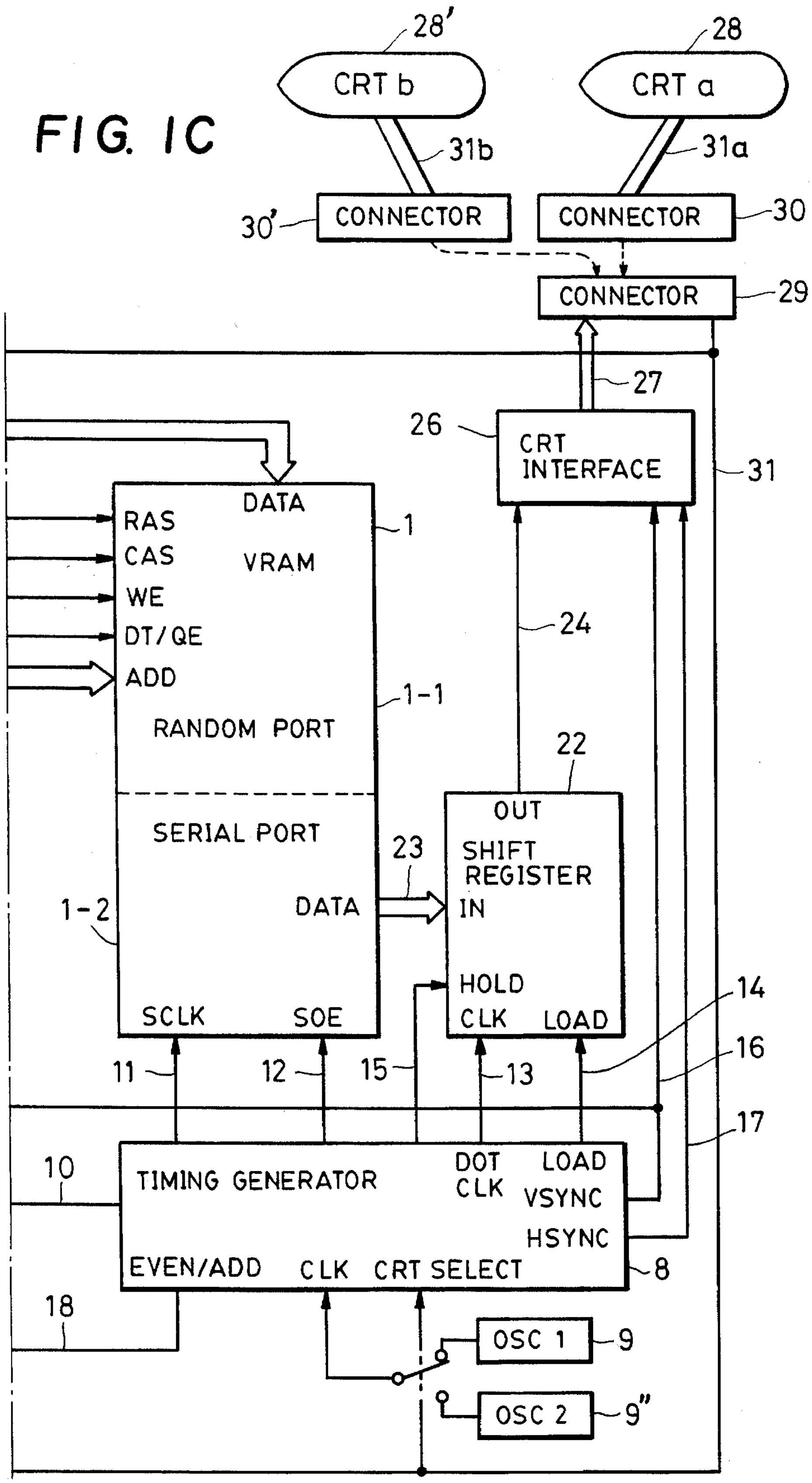

FIG. 1 is a block diagram of a display control unit of one embodiment of the present invention. In FIG. 1, bus masters 4-4" perform time-sharing control of a system bus 33. They may, for example, be a main processor (a CPU) 4, a DMA 4' and a video processor (a CPU) 4".

A video RAM (VRAM) 1 consists, for example, of eight 64k×4-bit dual port RAM's (DRAM's). Each DRAM comprises a 64k×4-bit random access port and a 256×4-bit serial access port. Accordingly, the total storage capacity of the VRAM 1 is 32 bits×64k=2M bits, and the VRAM 1 can store data for 2M pixels of a display surface (for example, for 1024 pixels×2048 lines). For a random port 1-1 of the VRAM 1, random access of 32 bits×64k is possible by a row address (8 bits) and a column (col) address (8 bits). For a serial port 1-2 of the VRAM 1, access of 32 bits in parallel and 256 in serial is possible by the row address (8 bits). By converting these values into a display picture surface of 1024 pixels/line, it is possible to perform a serial access for eight lines at one read. If a column address for the serial port 1-2 is assigned, it is possible to determine from which portion of the serial data serial access is to be performed.

A decoder 2 generates an access request signal 5 for the random port 1-1 according to an access request from the bus masters 4-4". A row/col address generator 3 generates a row address 6 and a column address 7 for the random port 1-1 according to address information from the bus masters 4-4".

A timing generator 8 generates various kinds of timing signals, or display control signals, necessary for display scanning, making an oscillator (OSC) 9 or 9' a standard clock-signal source. It generates, for example, in accordance with the progress of display, a data-transfer request signal 10 for requesting block transfer of image data from the random port 1-1 to the serial port 1-2 of the VRAM 1, a serial clock signal 11 and a serial output enable signal 12 for the serial port 1-2, a shift clock signal 13, a load signal 14 and a hold signal 15 for a shift register 22, a vertical synchronizing signal (VSYNC) 16 and a horizontal synchronizing signal (HSYNC) 17 for a CRT interface 26, a field discrimination signal 18, which is effective when CRT display is at an interlace mode, and the like.

A data-transfer-address generator 19 generates a row address 20 and a column address 21 when data are transferred from the random port 1-1 to the serial port 1-2 according to the data-transfer request signal 10. The shift register 22 latches 32-bit data 23 output from the serial port 1-2 according to the load signal 14, converts the latched data into a serial signal (an image signal) 24 by the shift clock signal 13 and outputs it.

A VRAM control unit 25 performs an arbitration between the access request signal 5 from the bus masters 4-4" and the data-transfer request signal 10 from the timing generator 8. That is, it determines which of the row/column addresses 8 and 7 or the row/column addresses 20 and 21 is to be added to the VRAM 1, and generates a row address strobe (RAS) signal, a column address strobe (CAS) signal, a write enable signal (WE) signal, a data transfer/output enable (DT/OE) signal and the like in accordance with the determination.

Figure 10:
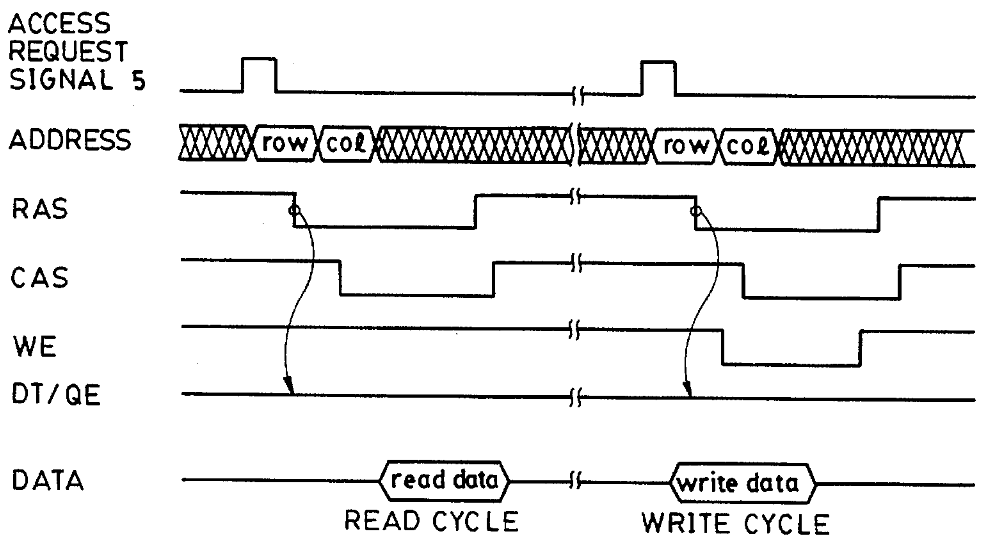
FIG. 10 is a timing chart for random access in the VRAM 1 shown in FIG. 1.

A CRT interface 28 converts the synchronizing signals VSYNC 18 and HSYNC 17 and the image signal 24 into a CRT signal 27 at a display-unit level. CRT display units 28 and 28', which are different in display method (that is, in type or format), are connected to a connector 29 via cables 30 and 30', respectively, and display images upon receiving CRT signals 27 in accordance with respective display methods. An identifying signal line **31*a* or 31*b* carries a signal identifying the display method of the display unit 28 or 28', and identification is performed at each related unit within the control unit when the display unit 28 or 28' is connected. An identifying signal 31 can also be read at the bus masters 4-4" via a gate FIG. 10 is a timing chart of random access in the VRAM 1. For example, the bus master 4 outputs address information to the bus 33 and instructs the writing of image data in the VRAM 1. The decoder 2 thereby generates the access request signal 5 for the random port 1-1 , and the row/col address generator 3 generates the row address 6 and the column address 7. The image data are sent via a data bus 100. The VRAM control unit 25 adds the row/col addresses 6 and 7 to the random port 1-1** together with a VRAM control signal and writes the image data in the corresponding address. Reading of the image data is also performed in a similar manner.

The bus master 4 understands, for example, the size of a picture surface as a continuous area of 1024 pixels×2048 lines, and forms an image for the VRAM 1 according to that understanding.

Figure 11:
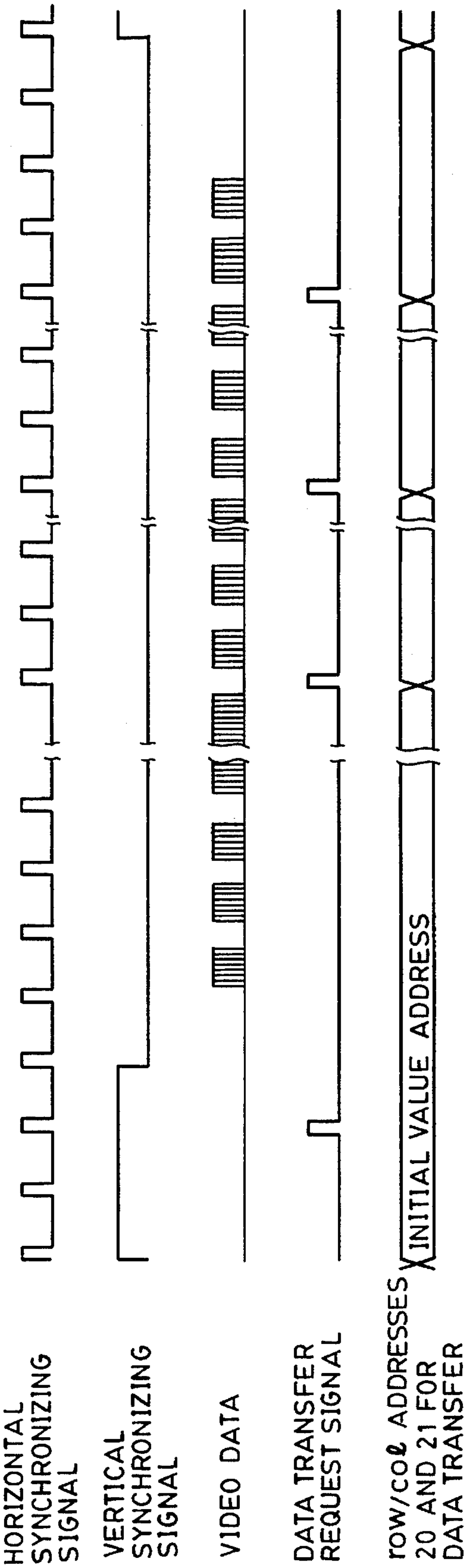
FIGS. 11 and 12 are timing charts for an example of CRT display control in the unit shown in FIG. 1.
Figure 12:
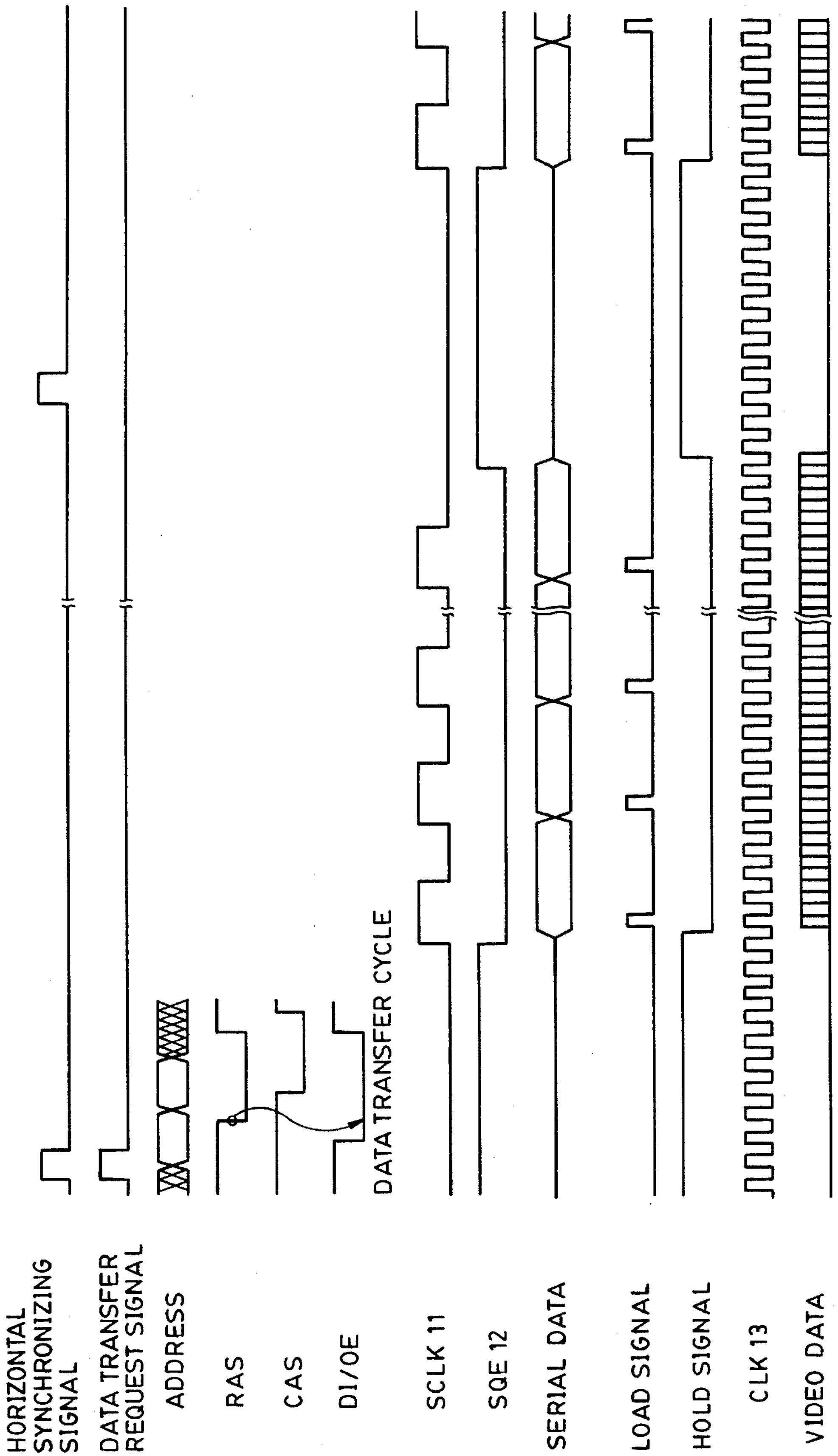
Figure 13:
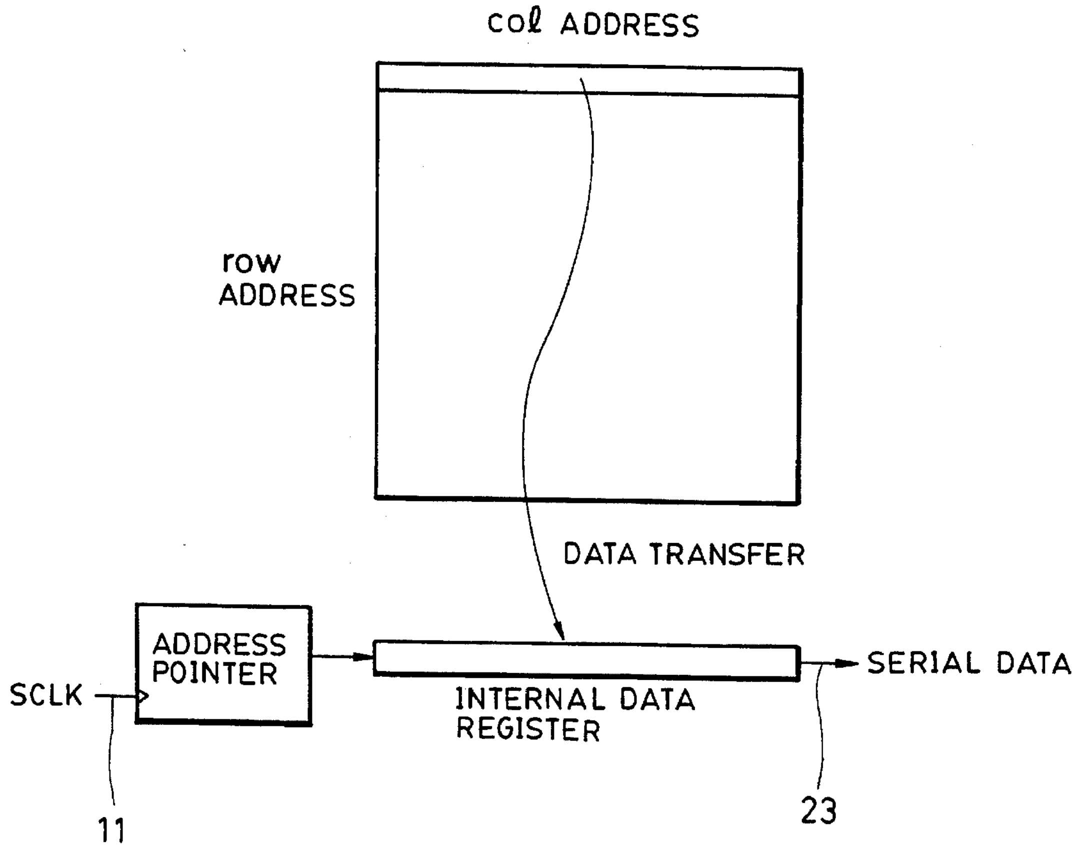
FIG. 13 is a diagram showing a relationship between the provision of a row address within the VRAM 1 and block serial transfer in the unit shown in FIG. 1.

FIGS. 11 and 12 are timing charts of an example of CRT display control , and FIG. 13 is a diagram showing a relationship between the provision of the row address within the VRAM 1 and block serial transfer. When the image data in the VRAM 1 is displayed on the CRT 28, the data-transfer-address generator 19 is first initialized at a timing of the vertical synchronizing signal 16. That is, it is arranged so that the row/column addresses 20 and 21 assign addresses (row=00, col=00) of the VRAM 1 corresponding to an initial scanning portion of the CRT 28. When a blanking period of the CRT 28 has lapsed, the data-transfer request signal 10 is output from the timing generator 8 before scanning line 0, and the VRAM control unit 25 adds the row/column addresses 20 and 21 and a control signal for data transfer for the VRAM 1. Image data for the initial eight lines are thereby transferred from the random port 1-1 to the serial port 1-2 (FIG. 13). Thereafter, by controlling the serial clock signal 11 and the serial output enable signal 12 in synchronization with CRT scanning, 32-bit image data 23 are successively sent to the shift register 22, latched by the load signal 14, and the image signal 24 is obtained by the shift clock signal 13. The image signal 24 is sent to the CRT 28 via the CRT interface 26 together with the synchronizing signals 16 and 17 generated at the timing generated 8. When no display data remain in the serial port 1-2 of the VRAM 1, the data-transfer request signal 10 is generated again. The data-transfer-address generator 19 thereby changes the address so as to address the block image data (row=01, column=00) to be subsequently displayed. Thus, by the next data transfer request, data to be subsequently displayed are transferred to the serial port 1-2 of the VRAM 1, and sent to the CRT 28 in the same manner as described above. When a scanning for one picture surface has been thus completed, the data-transfer-address generator 10 is initialized again by the vertical synchronizing signal 16, and the above-described processing is repeated.

A case in which display control is changed in accordance with the identifying signal 31 from the CRT unit will be hereinafter explained.

<When the sizes of picture surfaces are equal to each other, but there is a difference in scanning frequency>

This case is handled by the timing generator 8. That is, plural kinds of timing generation circuits are provided, and these circuits are selected by the identifying signal 31. The OSC 9 and 9' are switched if necessary. In this case, the identifying signal 31 does not influence the row/col address generator 3 and the data-transfer-address generator 19.

<When the sizes of picture surfaces are equal to each other, but in the case of interlace/noninterface operation>

Figure 2A:
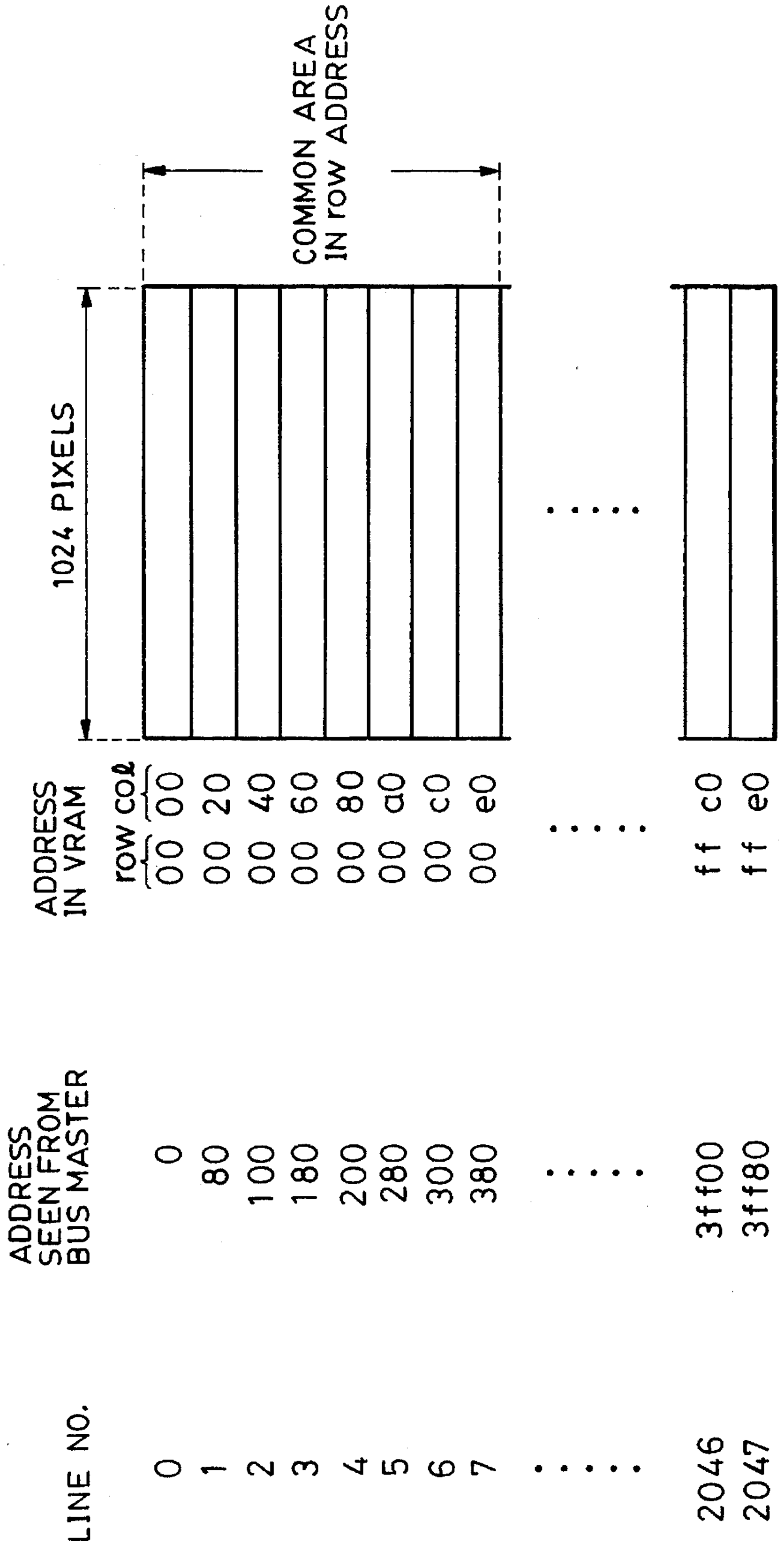
FIGS. 2(A)–2(C) are diagrams for explaining the operation of the unit shown in FIG. 1 in the case of a noninterlace display.
Figure 2B:
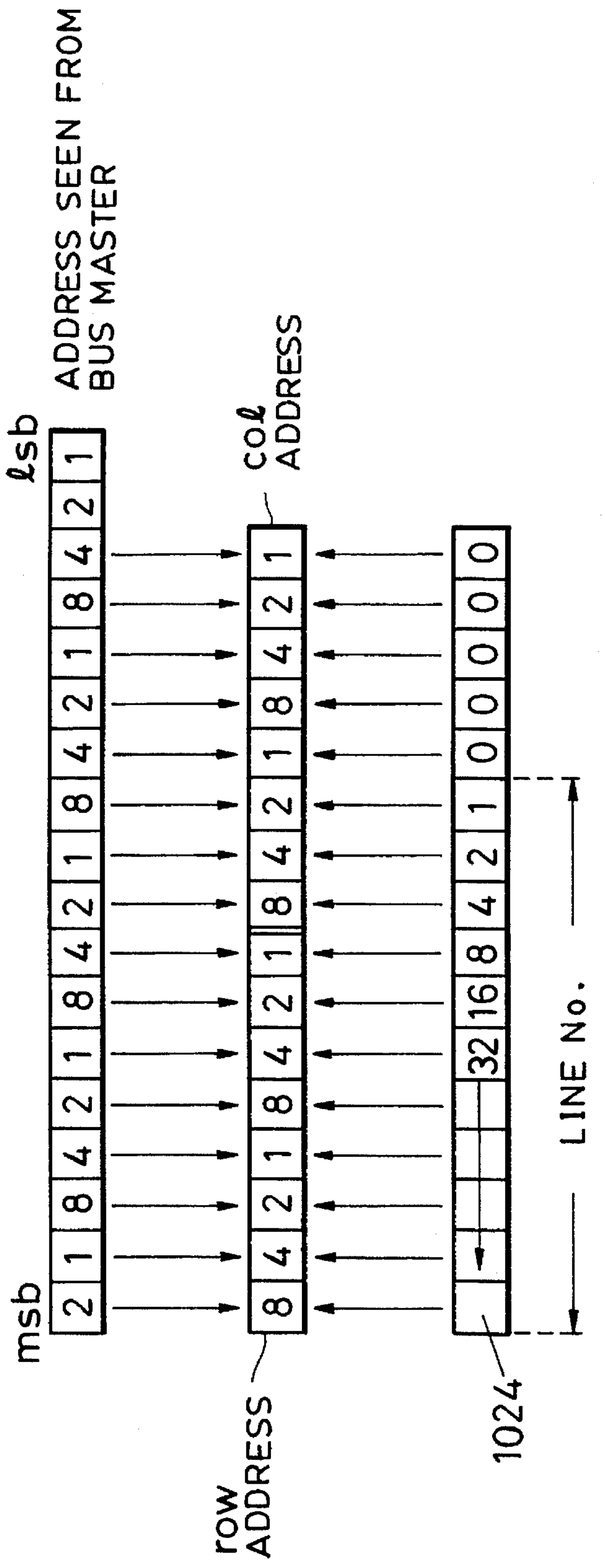
Figure 2:
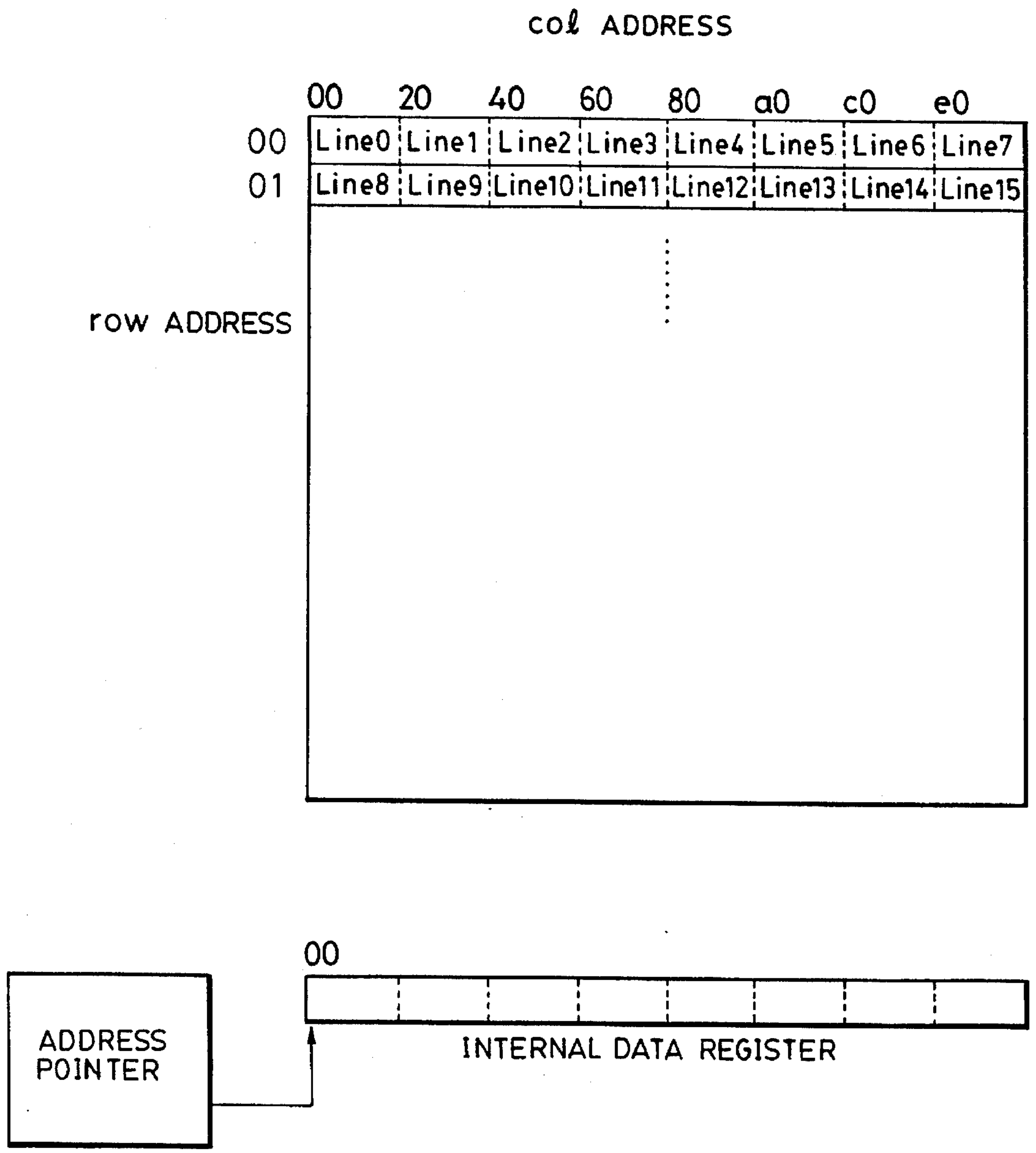

FIGS. 2(A)–2(C) are diagrams for explaining the operation in the case of noninterlace display. As described above, when the data-transfer request signal 10 and row address (0, 0) are added to the VRAM 1, video data for 1024 pixels×8 lines are continuously read. On the other hand, the bus master 4 tries to form image data in a continuous address space seen from the bus master irrespective of the type of CRT. In the case of noninterlace operation, the continuous address space seen from the bus master coincides with the read of the video data. Accordingly, in the case of noninterlace, the address from the bus master 4 is related to each 8 bits in the row address 6 and the column address 7 from its most significant bit (msb) with a relationship (a relationship as it is) shown in FIG. 2(B) at the row/col address generator 3. In FIG. 2(B), there are shown bit weights by hexadecimal representation for addresses, and bit weights by binary representation for line numbers. Thus, when writing image data on line 0, the bus master 4 instructs to write data of 32 bits×32 times=1024 pixels address 0000–007c seen from the bus master 4. This is converted into row/column address 0000–001f as it is by the row/col address generator 3. When writing image data on line 1, the bus master 4 instructs to write data of 1024 pixels in address 0080–00fc seen from the bus master. This is converted into row/column address 0020–003f as it is by the row/col address generator 3. The results of writing this image data are shown in FIG. 2(C).

Thus, for display in the case of noninterlace operation, continuous image data are read by making the column address 21 of the row/col addresses 20 and 21 zero, and incrementing the row address 20 for every data-transfer request signal 10.

There exists a request for performing write and read in a rectangular area on a CRT picture surface at high speed. This corresponds to, for example, a case in which an 8×8 character font is written, or a case in which an area hidden by a cursor is read and preserved in another buffer. As a method for high-speed access, there is a page mode access. By this method, a common area in the row address can be accessed only by reassigning the column address, and access can be performed at a speed quicker by a time interval for not assigning the row address.

Figure 3A:
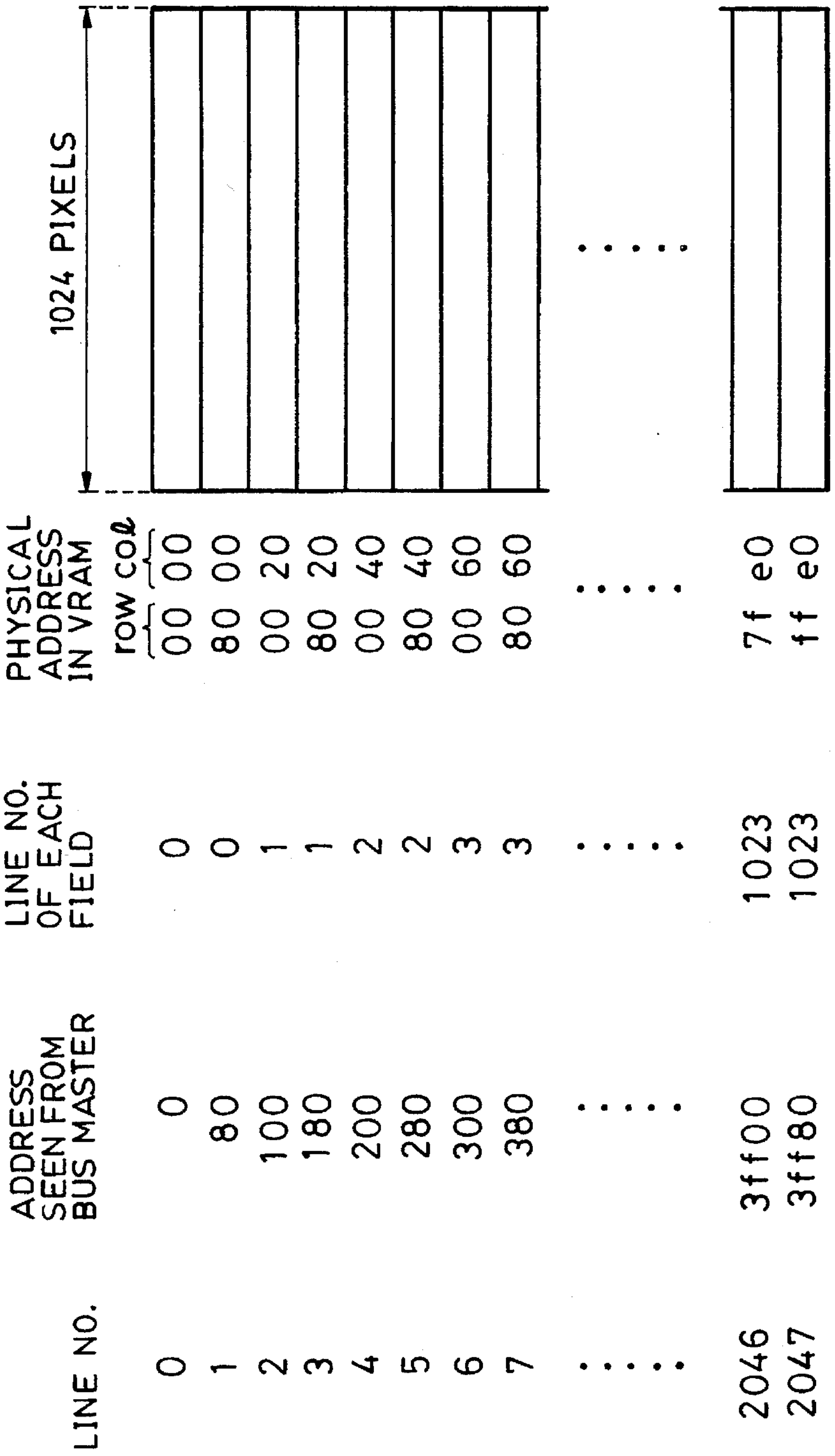
FIGS. 3(A)–3(C) are diagrams for explaining the operation of the unit shown in FIG. 1 in the case of an interlace display.
Figure 3B:
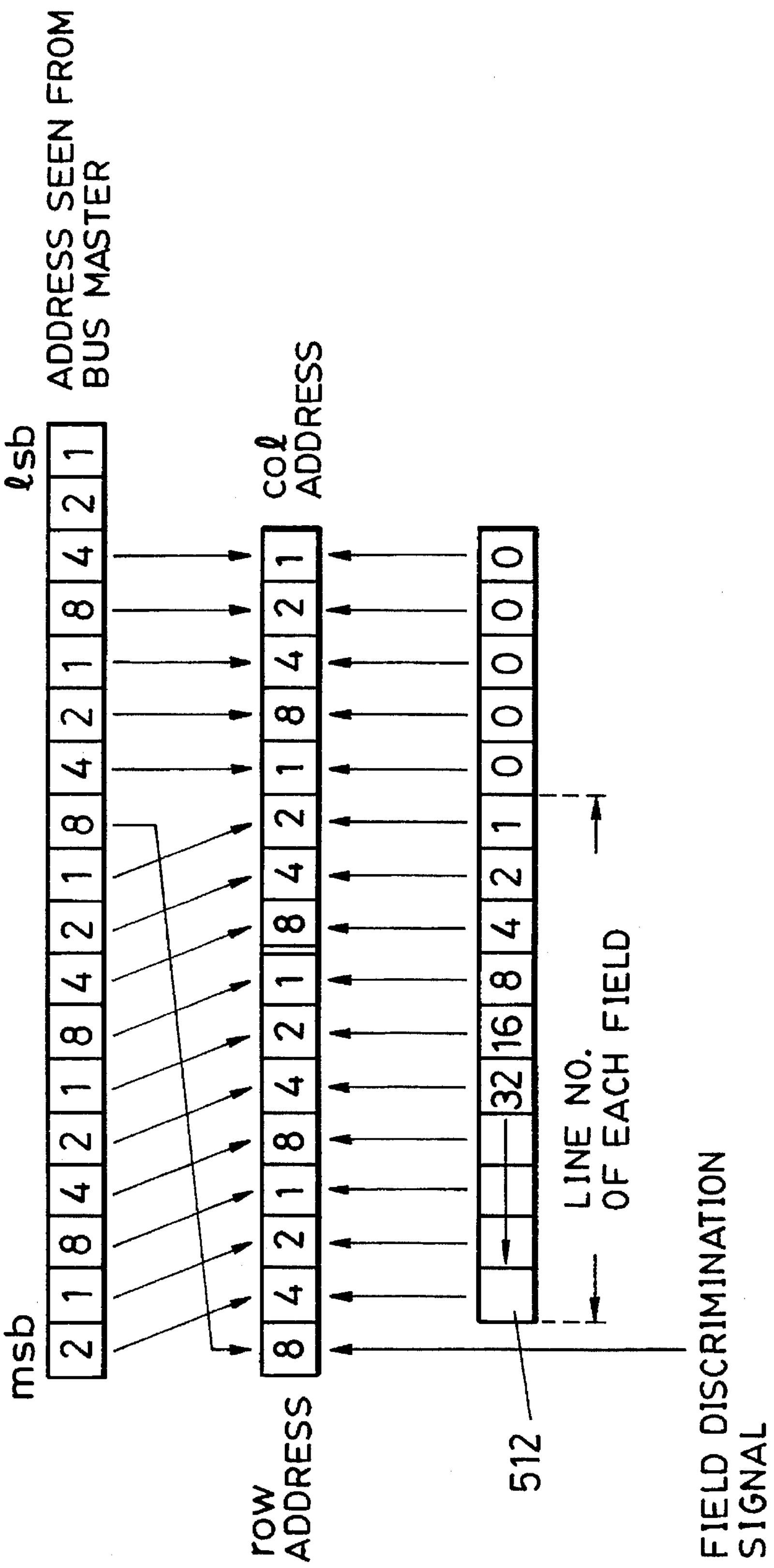
Figure 3C:
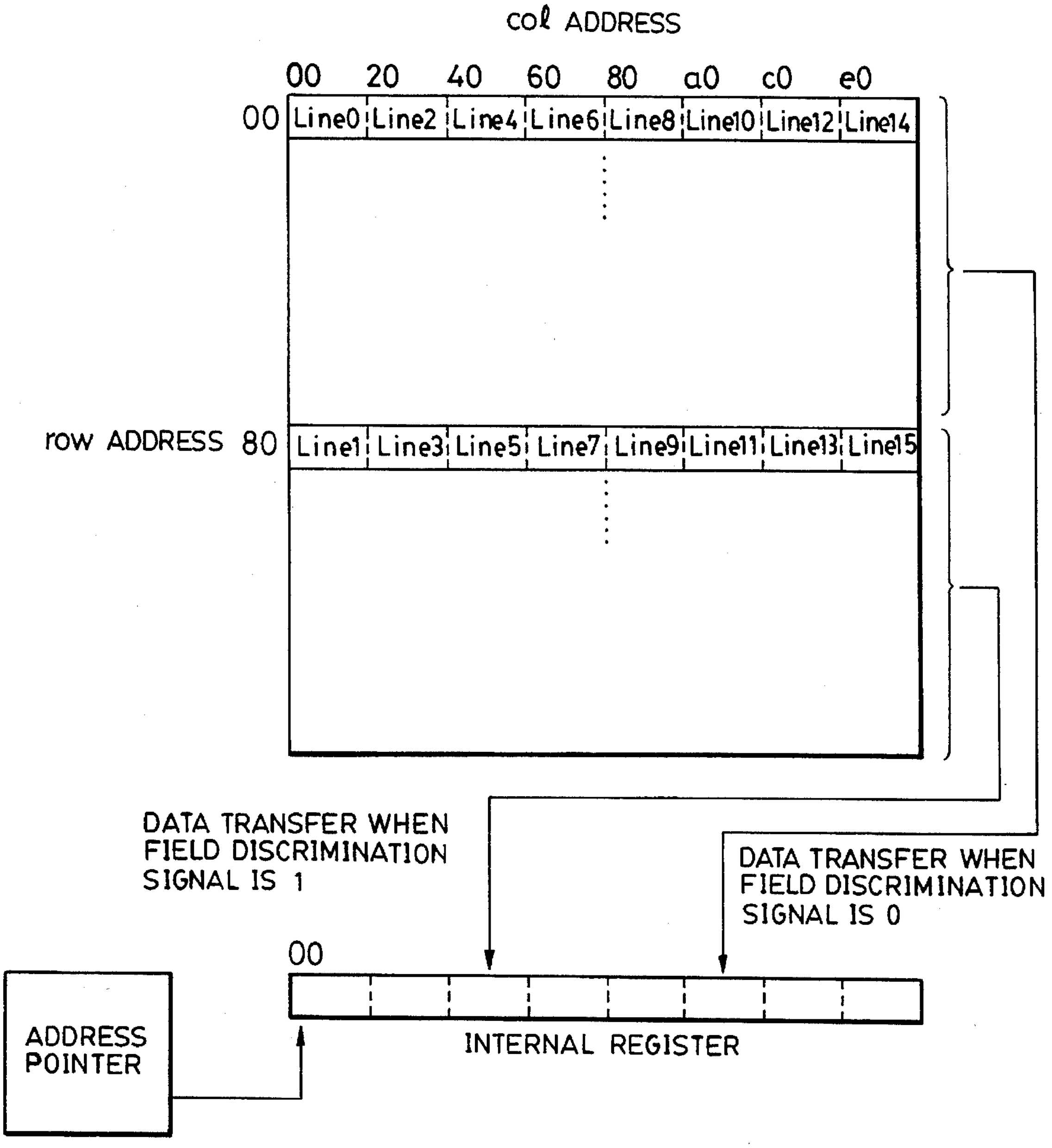

FIGS. 3(A)–3(C) are diagrams for explaining the operation in the case of interlace display. The CRT display unit 28' performs an interlace method of operation, for example, an interlaced scanning. That is, only even-numbered lines (0, 2, 4, 6, - - - ) are scanned at even-numbered fields, and only odd-numbered lines (1, 3, 5, 7, - - - ) are scanned at odd-numbered fields. Even in the case of interlace display, is preferable from the viewpoint of efficiency that, when row address (00) is added together with the data transfer request signal 10, video data for 1024 pixels×8 lines are continuously read from the VRAM 1. Hence, in the case of interlace operation, continuous images of even-numbered fields must be read with this block read cycle. On the other hand, the bus master 4 tries to form image data in a continuous address space seen from the bus master irrespective of the type of CRT. Accordingly, in the case of interlace, the address from the bus master is related to the row address 6 and the col address 7 from its most significant bit (msb) with a relationship shown in FIG. 3(B) at the row/col address generator 3. That is, address bit 7 of the bus 33 corresponds to bit 7 of the row address 6, and each address bit not less than 8 of the bus 33 corresponds to the row/column address 6 and 7 sequentially shifting to lower bit by one bit as shown in FIG. 3(B). Thus, when trying to write image data on line 1 (0080) seen from the bus master 4, the row/col address generator 3 performs writing by automatically converting them into line 1024 (row=80, column=00). When trying to write image data on line 2 (0100) seen from the bus master 4, the row/col address generator 3 performs writing by automatically converting them into line l(row=00, column=20). Thus, image data for even-numbered lines (fields) are continuously written up to the first half line 1023 in the VRAM 1, and image data for odd-numbered lines (fields) are continuously written in the remaining lines 1024–2047. The result of the writing is shown in FIG. 3(C).

Also in the case of interlace display, the data-transfer-address generator 19 makes the column address 21 zero, and increments the row address 20 by the data-transfer request signal 10. In this case, the field discrimination signal 18 is adopted for the seventh bit (msb) of the row address 20. The first eight lines of even-numbered fields are thereby continuously read by the first data-transfer request signal 10 of even-numbered fields, and the next eight lines of even-numbered fields are continuously read by the next data-transfer request signal 10, At the latter half odd-numbered fields, the first eight lines of odd-numbered fields are continuously read by the first data-transfer request signal 10, and the next eight lines of odd-numbered fields are continuously read by the next data-transfer request signal 10, Thus, interlace display is performed without burdening on the bus master 4.

Figure 4A:
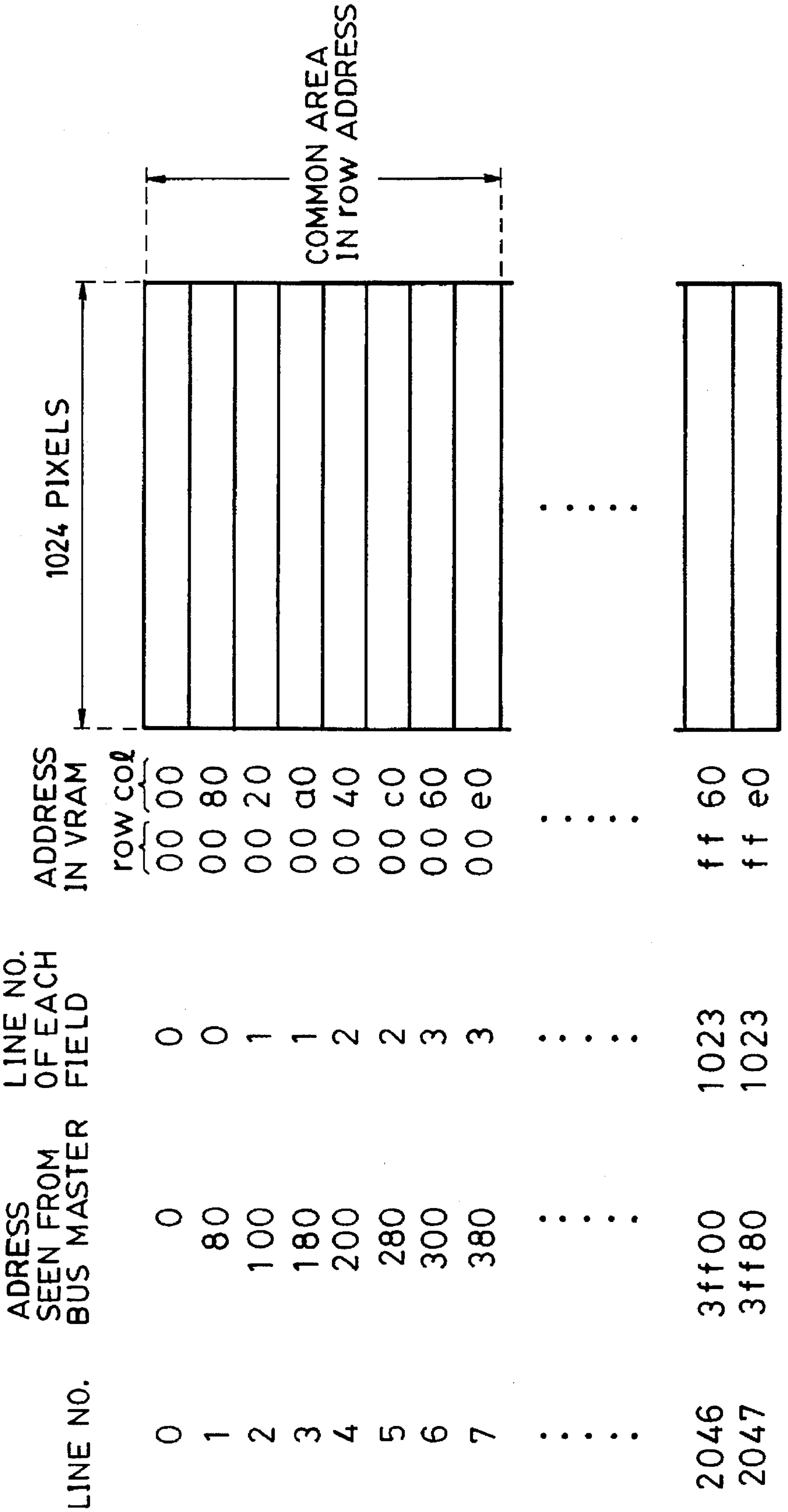
FIGS. 4(A)–4(C) are diagrams showing another example of the unit shown ion FIG. 1 of address conversion in the interlace method.
Figure 4B:
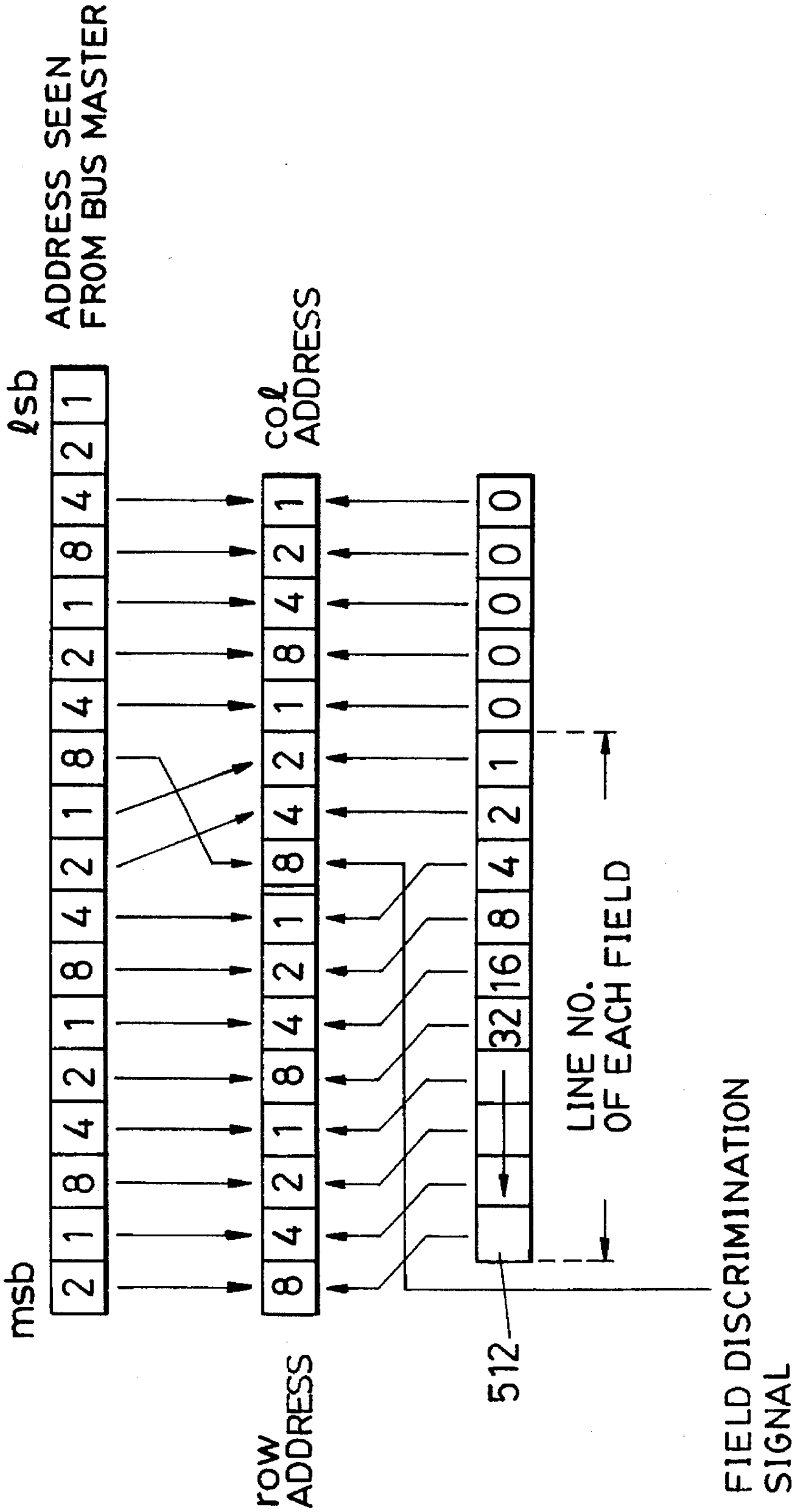

FIGS. 4(A)–4(C) are diagrams showing another example of address conversion in the interlace method, if the address seen from the bus master and the row/col address are made correspond to each other, for example, as shown in FIG. 4(B), image data are written as shown in FIG. 4(C), Even-numbered fields are formed at a position corresponding to the left half of the picture surface, and odd-numbered fields are formed at a position corresponding to the right half of the picture surface. While reading, the field discrimination signal is adopted as bit 7 of the column address. The first four lines of even-numbered fields are thereby continuously read by the first data-transfer request signal 10 of even-numbered fields, and the next four lines of even-numbered fields are read by the next data-transfer request signal 10. At the latter half odd-numbered fields, the first four lines of odd-numbered fields are continuously read by the data-transfer request signal 10, and the next four lines are continuously read by the next data-transfer request signal 10. In this case, the data-transfer request signal 10 is output for every four lines.

According to this method, a common area (line 0–7) in the row address can be provided in continuous eight lines, and it is possible to effectively utilize high-speed access by a page mode.

<When the sizes of picture surfaces are different from each other>

Consider, for example, a case in which the CRT 28 uses an interlace method of 1024 pixels×2048 lines, and the CRT 28' uses an interlace method of 2048 pixels×2048 lines, and there is a difference in resolution. For this purpose, 16 DRAM's are used, and eight of each become one block (block 0, block 1).

Figure 5A:
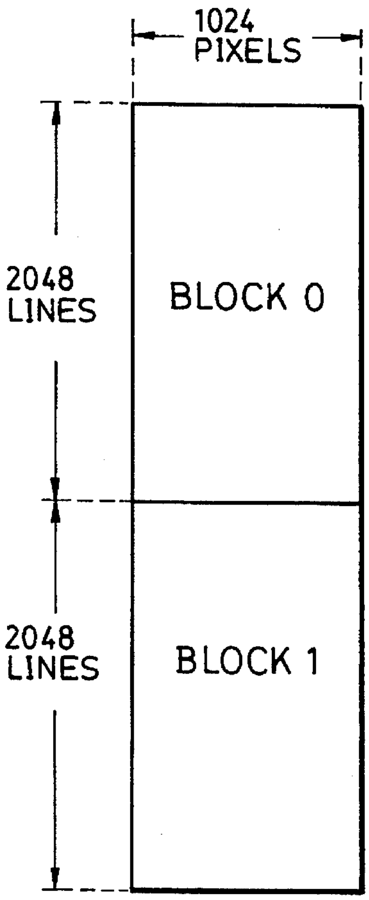
FIGS. 5(A) and 5(B) are diagrams showing picture-surface configurations of particular CRT's 28 and 28' that can be used in the unit shown in FIG. 1.
Figure 5B:
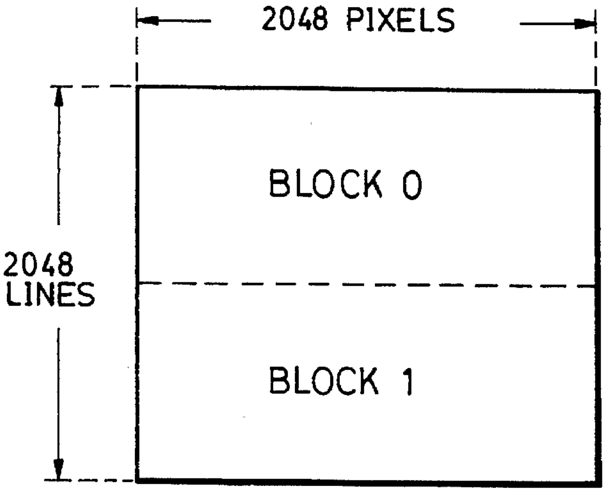

FIGS. 5(A) and 5(B) are diagrams showing the configurations of picture surfaces of the CRT's 28 and 28' in this case. Since the picture-surface size of the CRT 28 is 1024 pixels×2048 lines, video data for two picture surfaces can be stored.

Figure 4:
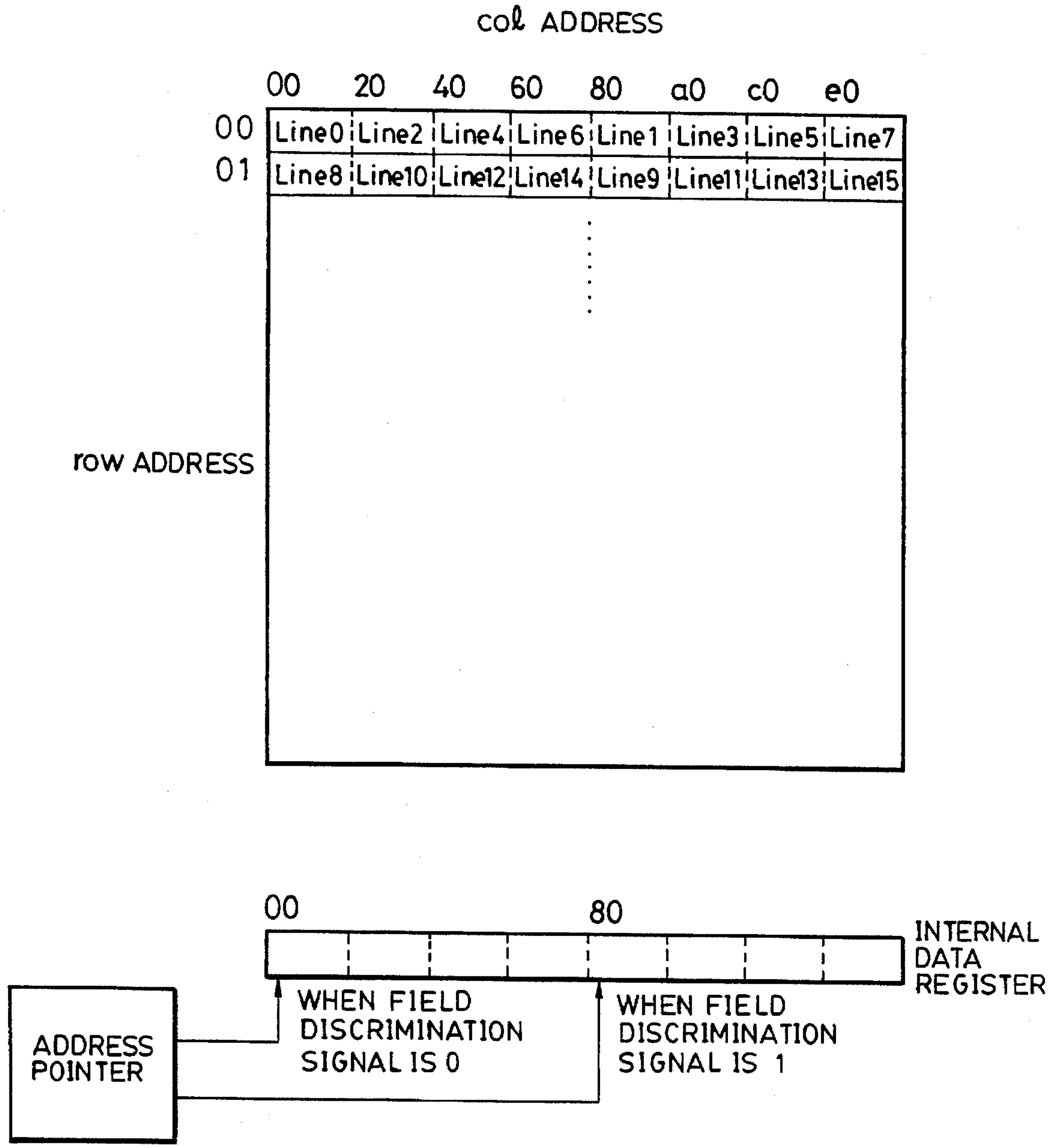
Figure 6A:
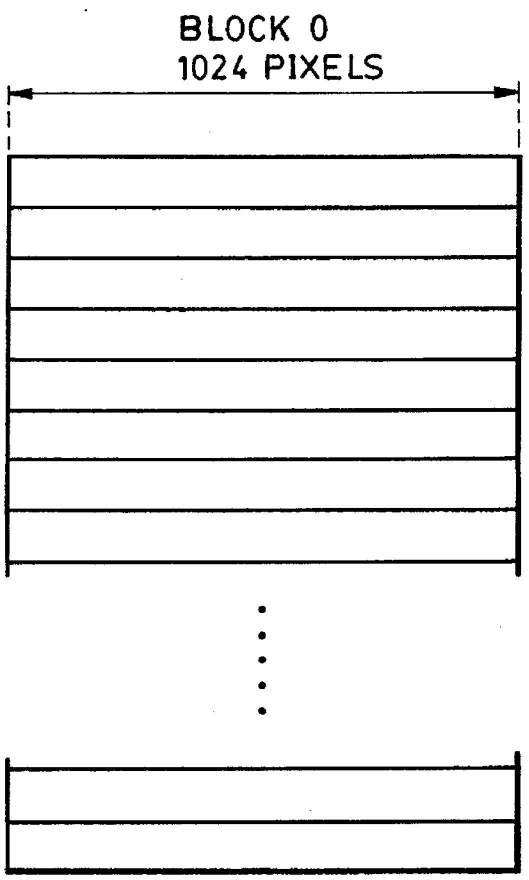
FIGS. 6(A) and 6(B) are diagrams showing an address allocation in the case of the CRT 28 (1024 pixels×2048 lines) of FIGS. 5(A) and 5(B)
Figure 6B:
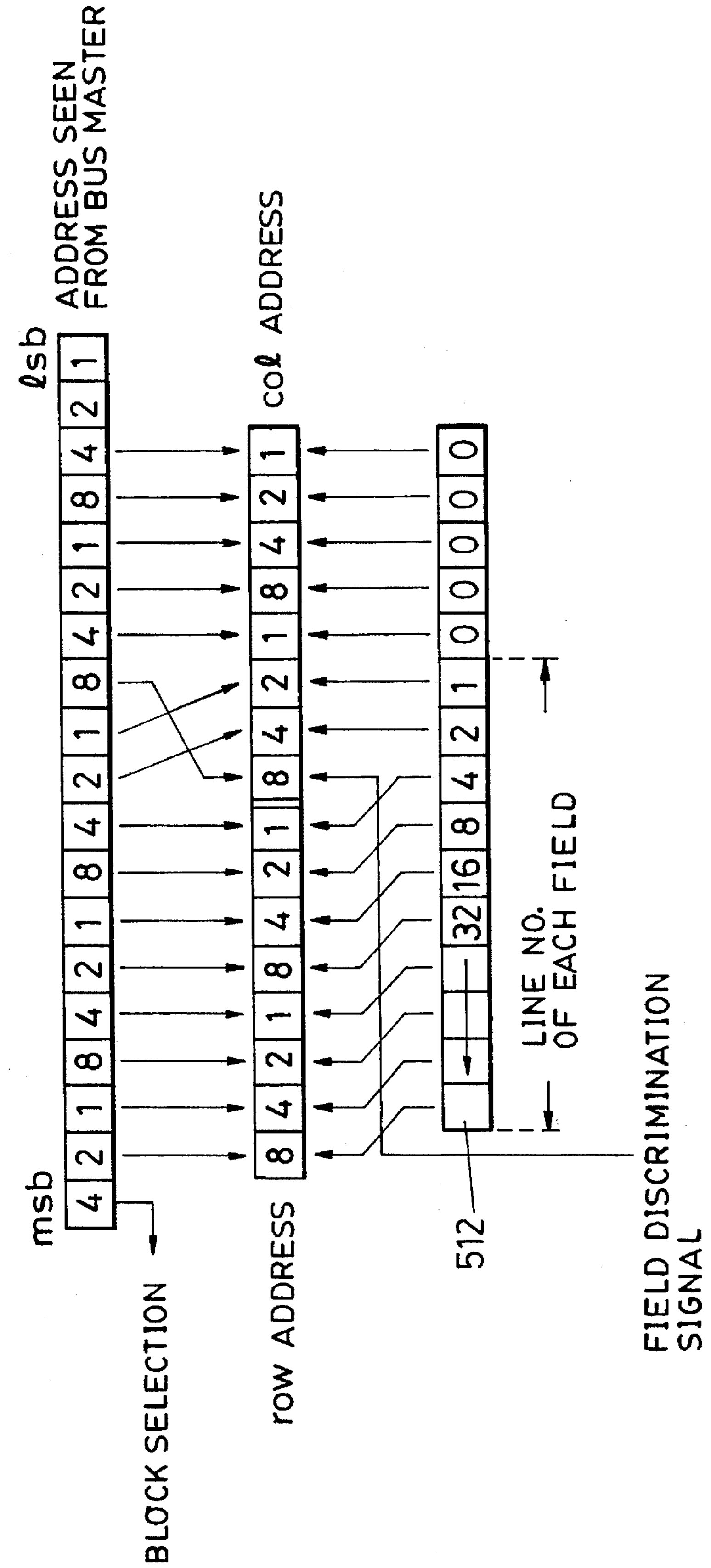

FIGS. 6(A) and 6(B) are diagrams showing an address allocation in the case of the CRT 28 (1024 pixels×2048 lines). In this case, a block-selection bit is provided at the most significant bit position, and block 0=0, and block 1=1. That is, address 40000 is added to block 1, and the other configuration is identical to that in FIG. 4.

Figure 7A:
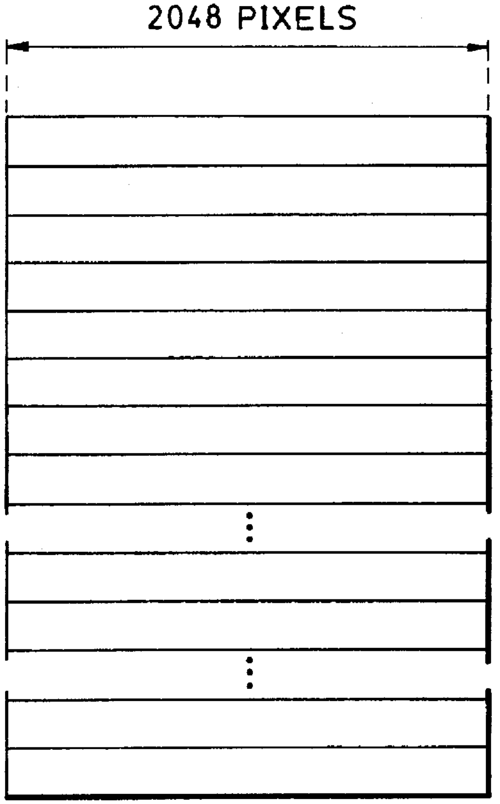
FIGS. 7(A) and 7(B) are diagrams showing an address allocation in the case of the CRT 28' (2048 pixels×2048 lines) of FIGS. 5(A) and 5(B)
Figure 7B:
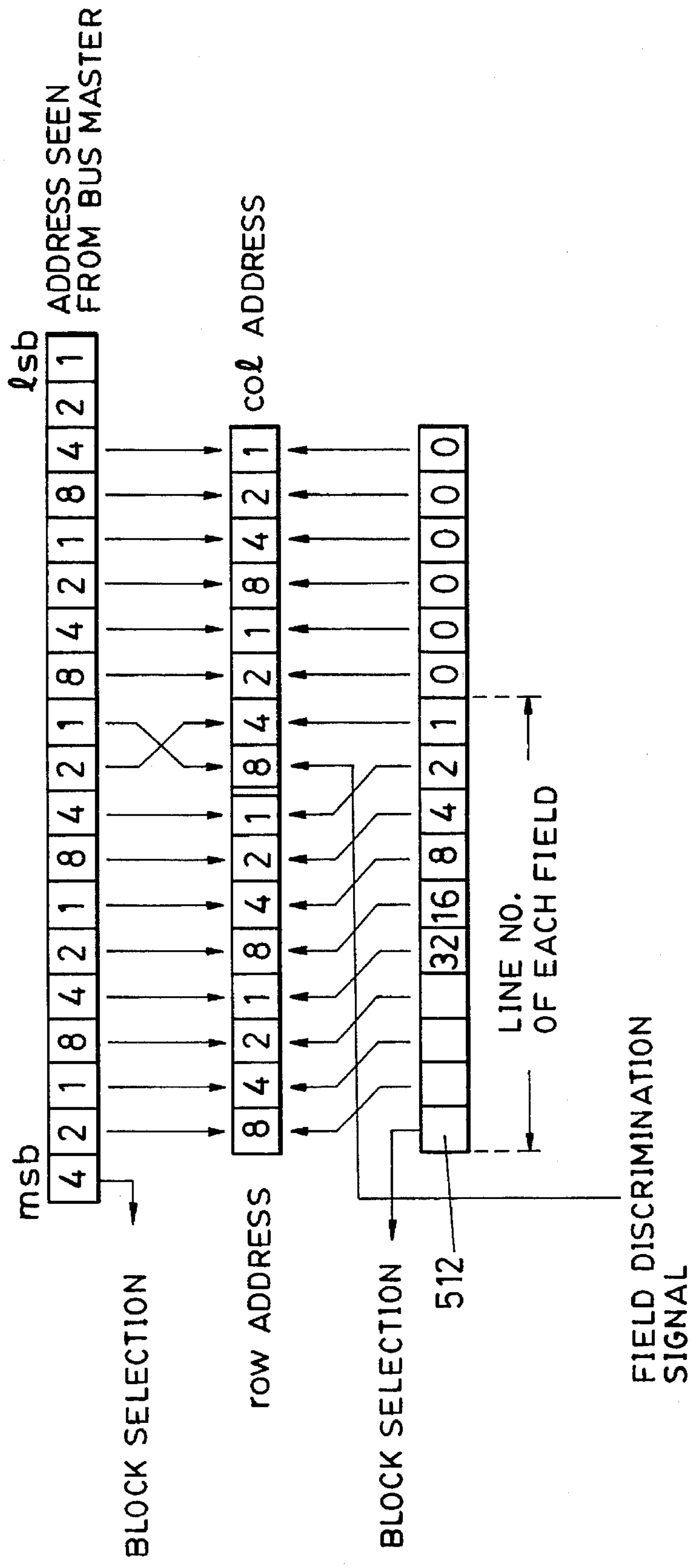

FIGS. 7(A) and 7(B) are diagrams showing an address allocation in the case of the CRT 28' (2048 pixels×2048 lines). In this case, the bus master 4 can image an image of 2048 pixels×2048 lines reading the identifying signal 31 of the CRT via the gate 32. While reading, lines 0, 1, 4, 5 - -

- and the like constitute even-numbered fields, and lines 2, 3, 6, 7 - - - and the like constitute odd-numbered fields.

Figure 8:
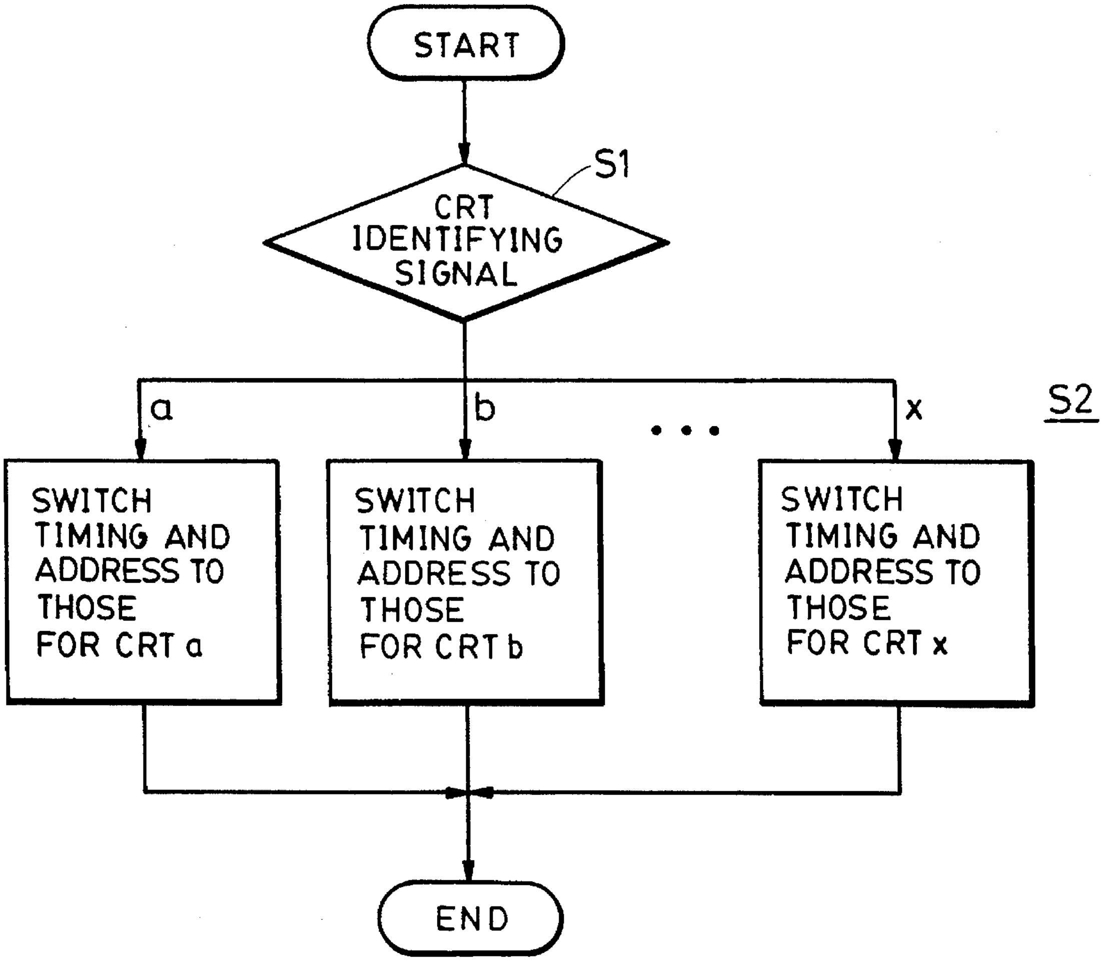
FIG. 8 is a flow chart of a control procedure for the display control unit of FIG. 1 used with the CRT's of FIGS. 5(A) and 5(B)

FIG. 8 is a flow chart of a control procedure in the display control unit of this particular embodiment, that is, when used with the CRT's depicted in FIGS. 5(A) and 5(B). In FIG. 8, the CRT identifying signal 31 is investigated at step S1. At step S2, the timing generator 8, the row/col address generator 3 and the data-transfer request generator 19 are changed to the corresponding controls in accordance with the identifying signals 31*a*–31*x*.

Figure 9:
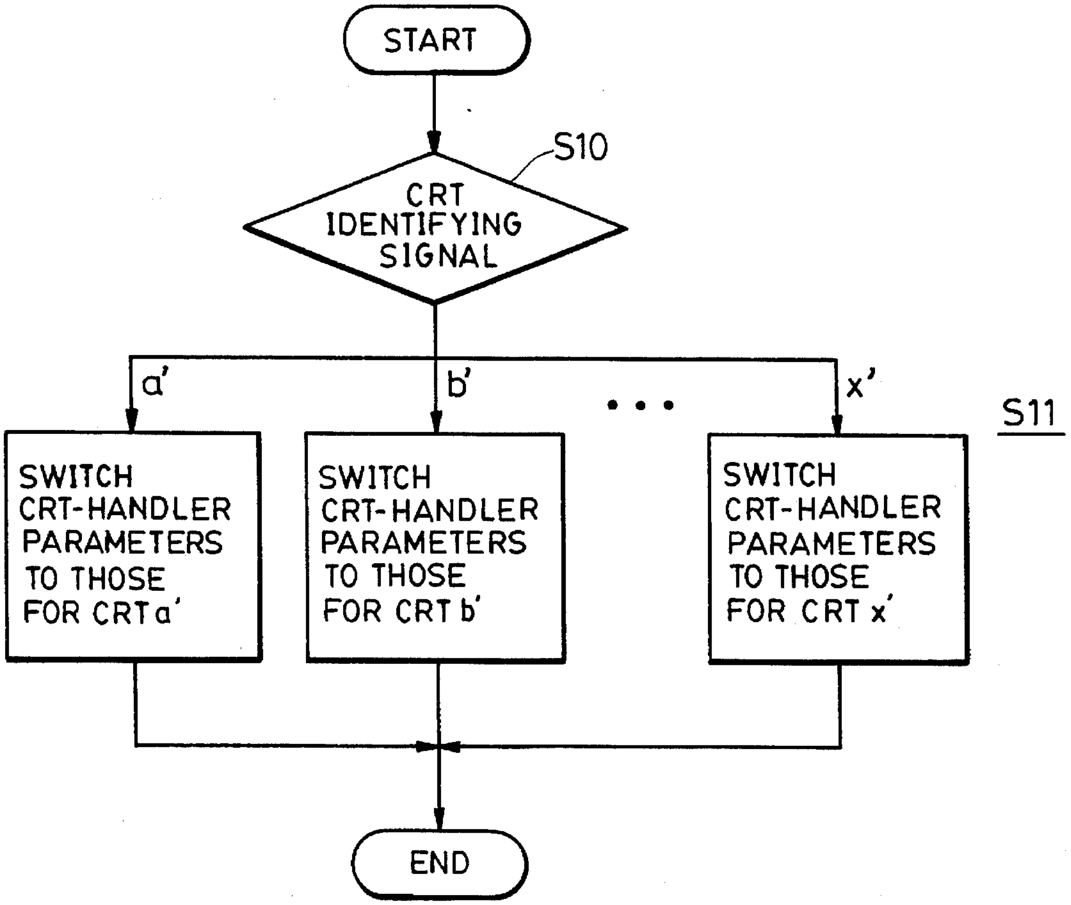
FIG. 9 is a flow chart; of a control procedure at the side of a bus master of FIG. 1 used with the CRT's of FIGS. 5(A) and 5(B)

FIG. 9 is a flow chart of a control procedure at the bus master side of this embodiment. This processing is needed when, for example, there is a difference in picture size. At step S10, the CRT identifying signal 31 is interrogated. At step S11, parameters (a picture-surface size and the like) of image handlers are set at the corresponding values in accordance with the identifying signals 31*a*'– 31*x*'.

Although CRT display units have been described in the above-described embodiment, it is not limited thereto. Other display units, such as a plasma display, an LED (a light-emitting diode), an LCD (a liquid crystal display) and the like may also be applicable.

Furthermore, although an explanation has been provided about only two kinds of display units in the above-described embodiment, the invention is not limited thereto. Even when three kinds, or more, of different display units are used, the row/column addresss generator 3, the timing generator 8 and the data-transfer-address generator 19 can be switched in many kinds of modes, according to a procedure in which the CRT identifying signal 31 is provided in plural bits.

The identifying signal 31 may also be generated by setting switches and the like instead of connectors.

As described above, according to the present invention, it is possible to perform display controls of different types without burdening on a host system.

What is claimed is:

1. A display control method comprising the steps of:

providing a plurality of displays for displaying images, with each of the displays having a different display control method and being responsive to display control signals;

providing each display with an identifying signal for identifying the display control method;

generating an identifying control signal for identifying a display control method of a particular one of the displays;

generating display control signals and setting a time period of applying the display control signals in accordance with the generated identifying control signal;

selecting an interlace control or a noninterlace; and controlling the particular display with the interlace control or the noninterlace control in accordance with the selected interlace or non-interlace control.

2. A display control method according to claim 1, wherein the identifying signal corresponds to a scan frequency of each of the displays.

3. A display control method for controlling a particular one of a plurality of displays which are different from each other, with each display having an identifying signal for identifying the display control method, said method comprising the steps of:

generating an identifying control signal for identifying a display control method of the particular one of the displays;

selecting an interlace control or a noninterlace control;

controlling the particular display with the interlace control or the noninterlace control in accordance with the selected control;

storing image data in a memory; and accessing the memory with a first mode of accessing when the interlace control is selected and a second mode of accessing when the non-interlace control is selected.

4. A display control method according to claim 3, wherein the identifying signal corresponds to a scan frequency of each of the displays.

5. A display control method comprising the steps of:

providing a plurality of displays for displaying images, with each of the displays having a different display control method;

providing each display with an identifying signal for identifying the display control method with an identifying signal;

generating an identifying control signal for identifying a display control method of a particular display;

generating display control signals and setting the time period of applying the display control signals in accordance with the generated identifying control signal; and in response to the display control signal, controlling the selected display with the generated display control signals.

6. A display control method according to claim 5, wherein the identifying signal corresponds to a scan frequency of each of the displays.

7. A display control method comprising the steps of:

providing a plurality of displays for displaying an image, with each display having a different control method;

providing each display with an identifying signal for identifying the display control method;

connecting one of the displays to a display control unit;

detecting the control method of the connected display;

generating the display control signal on the basis of the detected control method; and controlling the connected display on the basis of the generated display control signal.

8. A method as set forth in claim 7, further comprising the steps of:

storing display information; and displaying the stored display information on the display on the basis of the display control signal.

9. A method as set forth in claim 7, further comprising the step of providing a CRT for the display.

10. A display control method according to claim 7, wherein the identifying signal corresponds to a scan frequency of each of the displays.

11. A display control unit, comprising:

plural display means for displaying images, each of said plural display means having a different display control method and being responsive to display control signals;

identifying means, located in each of said display means, for identifying the display control method with an identifying signal;

generating means, in communication with said identifying means of a particular one of said plural display means, for generating an identifying control signal for identifying the display control method of the particular one of said plural display means;

display timing generation means for generating display control signals and setting a time period of applying the display control signals in accordance with the identifying control signal generated by said generating means;

selecting means for selecting an interlace control or a non-interlace control; and control means connected to said selecting means for controlling the particular one of said plural display means with the interlace control or the noninterlace control in accordance with the selection made by said selecting means.

12. A display control unit according to claim 11, wherein each of said plural display means is a CRT display.

13. A display control unit according to claim 11, wherein said plural display means are CRT displays having an equal picture-surface size and different scanning frequencies from each other.

14. A display control unit according to claim 11, wherein the identifying signal corresponds to a scan frequency of each of said plural display means.

15. A display control unit for controlling a particular one of a plurality of displays which are different from each other, comprising:

identifying means, located in each of the displays, for identifying a display control method with an identifying signal;

generating means, in communication with said identifying means of a particular one of the displays, for generating an identifying control signals for identifying the display control method of the particular one of the displays;

selecting means for selecting an interlace control or a non-interlace control;

control means connected to said selecting means for controlling the particular one of the displays with the interlace control or the non-interlace control in accordance with the selection made by said selecting means;

memory means for storing image data; and memory access means for accessing said memory means with a first mode of accessing when said selecting means selects the interlace control and a second mode of accessing when said selecting means selects the non-interlace control.

16. A display control unit according to claim 15, wherein each of said plural display means is a CRT display.

17. A display control unit according to claim 15, wherein each of said plural display means has a different picture-surface size.

18. A display control unit according to claim 15, wherein the identifying signal corresponds to a scan frequency of each of the displays.

19. A display control unit, comprising:

plural display means for displaying images, each of said plural display means having a different display control method;

connection means connected to each of said plurality of display means having a different display control method;

identifying means, located in each of said display means, for identifying the display control method with an identifying signal:

generating means, in communication with said identifying means of a particular one of said plural display means, for generating an identifying control signal for identifying the display control method of the particular one of said plural display means connected to said connection means;

display timing generation means for generating display control signals and setting a time period of applying the display control signals in accordance with the identifying control signal generated by said generation means; and control means, responsive to said display control signal of said display timing generation means, for controlling the particular one of said display means with the display control signals generated by said display timing generation means and applied to said connection means.

20. A display control unit according to claim 19, wherein the display are CRT displays.

21. A display control unit according to claim 19, wherein the identifying signal corresponds to a scan frequency of each of said plural display means.

22. A display control unit, comprising:

plural display means for displaying images, each of said plural display means having a different display control method;

identifying means, located in each of said display means, for identifying the display control method with an identifying signal;

connection means connected to each of said plurality of display means having different display control methods;

generating means, in communication with said identifying means of a particular one of said plural display means, for generating an identifying control signal for identifying the display control method of the particular one of said display means connected to said connection means;

memory means for storing image data;

display timing generation means for generating display control signals and setting a time period of applying the display control signals in accordance with the identifying control signal generated by said generation means; and control means for controlling said memory means in sync with a time period of display of said display timing generation means.

23. A display control unit according to claim 22, wherein said displays are CRT displays.

24. A display control unit according to claim 22, wherein the identifying signal corresponds to a scan frequency of each of said plural display means.

25. A display control unit, comprising:

plural display means for displaying images, each of said plural display means having a plurality of displays each having different display control methods;

identifying means, located in each of said displays, for identifying the display control method with an identifying signal;

connection means connected to said display means;

generating means, in communication with said identifying means of a particular one of said displays, for generating an identifying control signal for identifying the display control method of the particular one of said displays connected to said connection means;

memory means for storing image data, said memory means being accessible by said generating means;

memory control means, in response to said identifying signal, for changing access of said memory means by said generating means; and display control means for controlling image data read by said memory control means and displayed by said display means.

26. A display control unit according to claim 25, wherein said connection means is connected to a plurality of display means.

27. A display control unit according to claim 25, wherein the identifying signal corresponds to a scan frequency of each of said displays.

28. A display control unit, comprising:

a plurality of display means for displaying an image, each display means having a different control method;

identifying means, located in each of said display means, for identifying the display control method with an identifying signal;

connection means to be connected to one of said plurality of display means having different control methods;

detection means for detecting the control method of said connected display means;

timing generation means for generating a display control signal on the basis of the detected control method; and control means for controlling said connected display means on the basis of said generated display control signal.

29. A display control unit according to claim 28, further comprising storage means for storing display information, wherein said control means displays the stored display information on said display means on the basis of said display control signal.

30. A display control unit according to claim 28, wherein each said display means is a CRT display means.

31. A display control unit according to claim 28, wherein the identifying signal corresponds to a scan frequency of each of said plural display means.

* * * * *

UNITED STATES PATENT AND TRADEMARK OFFICE

CERTIFICATE OF CORRECTION

PATENT NO. : 5,506,602

DATED : April 9, 1996

INVENTOR(S) : Yokoyama

It is certified that error appears in the above-indentified patent and that said Letters Patent is hereby corrected as shown below:

Title Page:

[54] TITLE:

"CO" should read --CONTROL METHOD--.

COLUMN 1:

Line 9, "CO" should read --CONTROL METHOD--.

COLUMN 2:

Line 24, "ion" should read --in--.

COLUMN 3:

Line 59, "gate" should read --gate 32.--.

COLUMN 4:

Line 33, "generated 8." should read --generator 8.--.

Signed and Sealed this

Twenty-fourth Day of September, 1996

*Attest:*

BRUCE LEHMAN

*Attesting Officer* *Commissioner of Patents and Trademarks*